(12) United States Patent
Kim et al.

(10) Patent No.: US 10,805,140 B2
(45) Date of Patent: Oct. 13, 2020

(54) METHOD FOR TRANSMITTING AND RECEIVING SOUNDING REFERENCE SIGNAL BETWEEN TERMINAL AND BASE STATION IN WIRELESS COMMUNICATION SYSTEM, AND APPARATUS FOR SUPPORTING SAME

(71) Applicant: LG Electronics Inc., Seoul (KR)

(72) Inventors: Seonwook Kim, Seoul (KR); Jiwon Kang, Seoul (KR); Hyunsoo Ko, Seoul (KR); Youngtae Kim, Seoul (KR); Joonkui Ahn, Seoul (KR); Suckchel Yang, Seoul (KR); Seungmin Lee, Seoul (KR); Hyukjin Chae, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/334,437

(22) PCT Filed: Sep. 27, 2017

(86) PCT No.: PCT/KR2017/010707
§ 371 (c)(1),
(2) Date: Mar. 19, 2019

(87) PCT Pub. No.: WO2018/062841
PCT Pub. Date: Apr. 5, 2018

(65) Prior Publication Data
US 2019/0215217 A1 Jul. 11, 2019

Related U.S. Application Data

(60) Provisional application No. 62/401,816, filed on Sep. 29, 2016, provisional application No. 62/412,239, filed on Oct. 24, 2016.

(51) Int. Cl.
*H04L 27/26* (2006.01)
*H04W 72/04* (2009.01)
(Continued)

(52) U.S. Cl.
CPC ........ *H04L 27/2675* (2013.01); *H04L 5/0007* (2013.01); *H04L 5/0048* (2013.01);
(Continued)

(58) Field of Classification Search
CPC .................................................. H04L 27/2675
See application file for complete search history.

(56) References Cited

U.S. PATENT DOCUMENTS

2010/0232285 A1    9/2010   Lee et al.
2011/0294529 A1* 12/2011   Luo ....................... H04L 5/0035
                                                                                                         455/509
(Continued)

FOREIGN PATENT DOCUMENTS

WO      2014089782 A1    6/2014

OTHER PUBLICATIONS

Qualcomm Incorporated, "PUSCH rate matching and SRS dropping", 3GPP TSG RAN WG1 Meeting #86, Aug. 22-26, 2016, R1-167311.
(Continued)

*Primary Examiner* — Edan Orgad
*Assistant Examiner* — Won Tae C Kim
(74) *Attorney, Agent, or Firm* — Dentons US LLP

(57) ABSTRACT

Disclosed are a method for transmitting and receiving a signal between a terminal and a base station in a wireless communication system, and an apparatus for supporting the same. In particular, disclosed are: a method for transmitting and receiving a signal, including the uplink data, between a terminal and a base station when a sounding reference signal
(Continued)

is configured within a time interval in which uplink data is scheduled; and an apparatus for supporting the same.

11 Claims, 13 Drawing Sheets

(51) Int. Cl.
*H04L 5/00* (2006.01)
*H04L 27/00* (2006.01)

(52) U.S. Cl.
CPC ...... *H04L 27/2607* (2013.01); *H04L 27/2613* (2013.01); *H04W 72/0466* (2013.01); *H04L 5/001* (2013.01); *H04L 27/0006* (2013.01)

(56) References Cited

U.S. PATENT DOCUMENTS

| | | | | |
|---|---|---|---|---|
| 2012/0093119 | A1* | 4/2012 | Kim | H04L 5/0051 |
| | | | | 370/329 |
| 2012/0307779 | A1* | 12/2012 | Noh | H04J 1/02 |
| | | | | 370/329 |
| 2014/0254492 | A1 | 9/2014 | Noh et al. | |
| 2015/0009951 | A1* | 1/2015 | Josiam | H04L 25/0224 |
| | | | | 370/330 |
| 2019/0215110 | A1* | 7/2019 | Yang | H04W 74/002 |

OTHER PUBLICATIONS

Nokia, Alcatel-Lucent Shanghai Bell, "On the Subframe Indication in SRS Triggering in eLAA", 3GPP TSG RAN WG1 Meeting #86, Aug. 22-26, 2016, R1-167625.

* cited by examiner

FIG. 9
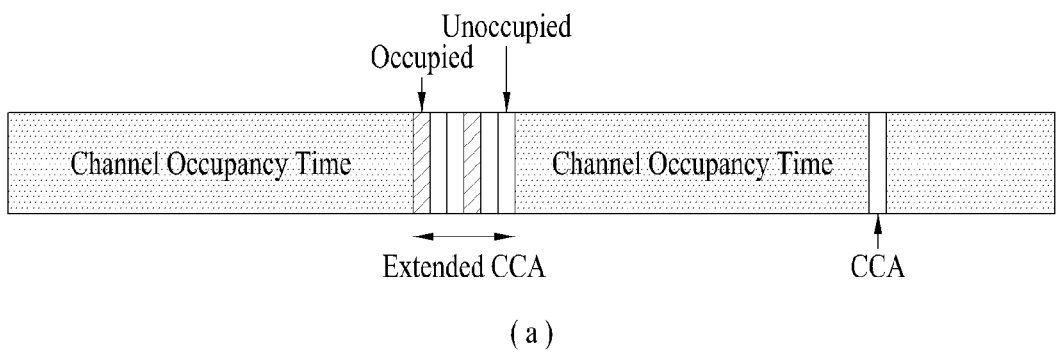
(a)
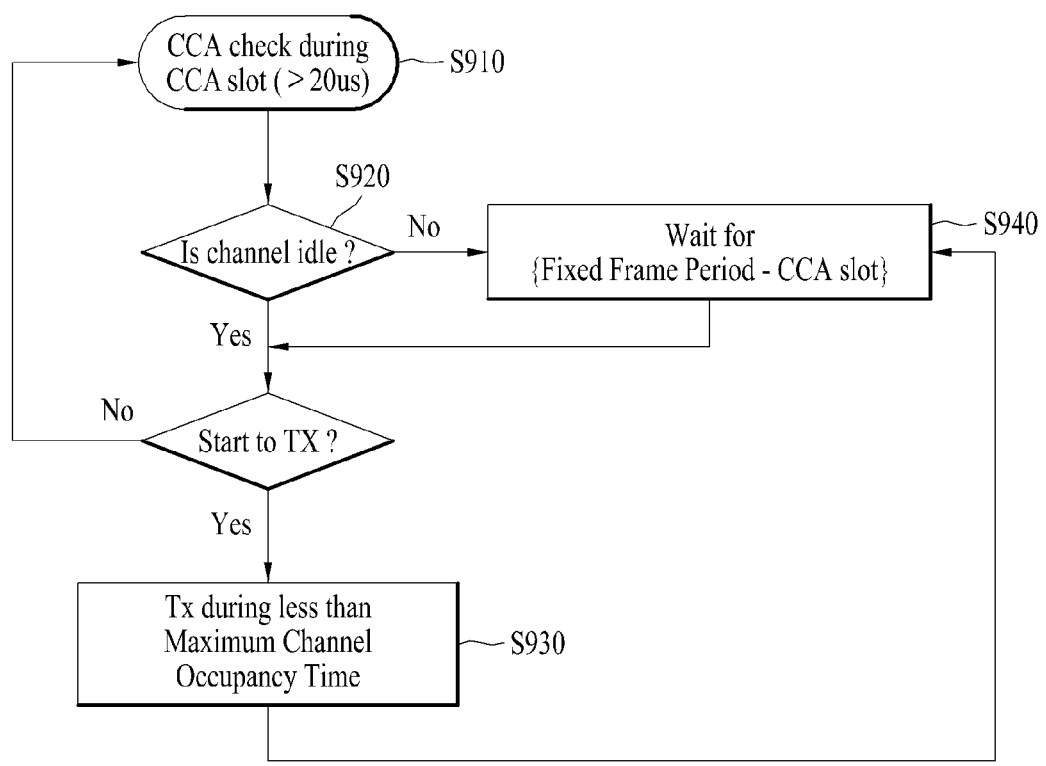
(b)

METHOD FOR TRANSMITTING AND RECEIVING SOUNDING REFERENCE SIGNAL BETWEEN TERMINAL AND BASE STATION IN WIRELESS COMMUNICATION SYSTEM, AND APPARATUS FOR SUPPORTING SAME

This application is a National Stage Entry of International Application No. PCT/KR2017/010707 filed Sep. 27, 2017, which claims priority to U.S. Provisional Application Nos. 62/401,816 filed Sep. 29, 2016 and 62/412,239 filed Oct. 24, 2016, all of which are incorporated herein by reference.

TECHNICAL FIELD

The following description relates to a wireless communication system and to a method of transmitting and receiving a signal between a user equipment and a base station in a wireless communication system and an apparatus supporting the same.

Particularly, the following description relates to a method of transmitting and receiving a signal including uplink data between a user equipment and a base station when a sounding reference signal is configured within a time interval in which the uplink data is scheduled and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DETAILED DESCRIPTION OF THE INVENTION

Technical Problems

An object of the present invention is to provide a method of transmitting and receiving a signal including uplink data by a user equipment and a base station when a sounding reference signal is configured within a time interval in which the uplink data is scheduled in a newly proposed wireless communication system and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention provides a method and apparatus for transmitting and receiving a signal between a user equipment and a base station in a wireless communication system.

According to an aspect of the present invention, provided herein is a method of transmitting and receiving a signal to and from a base station by a user equipment in a wireless communication system, including receiving sounding reference signal (SRS) configuration information from the base station, wherein the SRS configuration information includes information on an SRS resource configured for an SRS within a time interval where uplink data is scheduled and validity information related to the SRS resource, and transmitting a signal including the uplink data based on the SRS configuration information, wherein when the SRS resource is not valid, the user equipment transmits the uplink data with performing rate matching for the SRS resource, and when a position of the SRS resource is valid, the user equipment transmits the uplink data with performing rate matching for the SRS resource and transmits the SRS via the SRS resource based on an SRS transmission method informed by the SRS configuration information.

In another aspect of the present invention, provided herein is a method of transmitting and receiving a signal to and from a user equipment by a base station in a wireless communication system, including transmitting sounding reference signal (SRS) configuration information to the user equipment, wherein the SRS configuration information includes information on an SRS resource configured for an SRS within a time interval where uplink data is scheduled and validity information related to the SRS resource, and receiving a signal including the uplink data based on the SRS configuration information, wherein when the SRS resource is not valid, the uplink data is received without rate matching for the SRS resource, and when a position of the SRS resource is valid, the base station receives the uplink data with rate matching for the SRS resource and receives the SRS via the SRS resource is received based on an SRS transmission method indicated by the SRS configuration information.

In another aspect of the present invention, provided herein is a user equipment for transmitting and receiving a signal to and from a base station in a wireless communication system, including a transmitter; a receiver; and a processor connected to the transmitter and the receiver to perform an operation, wherein the processor is configured to receive sounding reference signal (SRS) configuration information from the base station, the SRS configuration information includes information on an SRS resource configured for an SRS within a time interval where uplink data is scheduled and validity information related to the SRS resource, the processor is configured to transmit a signal including the uplink data based on the SRS configuration information, when the SRS resource is not valid, the processor is configured to transmit the uplink data without performing rate matching for the SRS resource, and when a position of the SRS resource is valid, the processor is configured to transmit the uplink data by performing rate matching for the SRS resource and transmit the SRS through the SRS resource based on an SRS transmission method indicated by the SRS configuration information.

In another aspect of the present invention, provided herein is a base station for transmitting and receiving a signal to and from a user equipment in a wireless communication system, including a transmitter; a receiver; and a processor connected to the transmitter and the receiver to perform an operation, wherein the processor is configured to transmit sounding reference signal (SRS) configuration information to the user equipment, the SRS configuration information includes information on an SRS resource configured for an SRS within a time interval where uplink data is scheduled and validity information regarding the SRS resource, the processor is configured to receive a signal including the uplink data based on the SRS configuration information, when the SRS resource is not valid, the processor is configured to receive the uplink data without performing rate matching for the SRS resource, and when a position of the SRS resource is valid, the processor is configured to receive the uplink data by performing rate matching for the SRS resource and receive the SRS received via the SRS resource based on an SRS transmission method indicated by the SRS configuration information.

The SRS configuration information may further include at least one of information on a maximum allowed bandwidth spanned by the SRS resource, information on a periodicity and an offset value for the SRS configuration, information on the number of antenna ports for the SRS configuration, and sequence information related to the SRS.

The sequence information related to the SRS may include at least one of a cyclic shift value applied to the SRS, an orthogonal cover code applied to the SRS, and sequence scrambling information applied to the SRS.

A part of the information included in the SRS configuration information may be transmitted via higher-layer signaling and the remaining part of the information included in the SRS configuration information may be transmitted via physical-layer signaling.

The SRS transmission method indicated by the SRS configuration information may be one of a non-zero power transmission method and a zero power transmission method.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, a user equipment and a base station can efficiently transmit and receive a sounding reference signal configured within a time interval in which uplink data is scheduled, based on sounding reference signal configuration information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

FIG. 9 is a diagram illustrating an exemplary load based equipment (LBE) operation as one of the LBT operations;

BEST MODE FOR CARRYING OUT THE INVENTION

Figure 1:
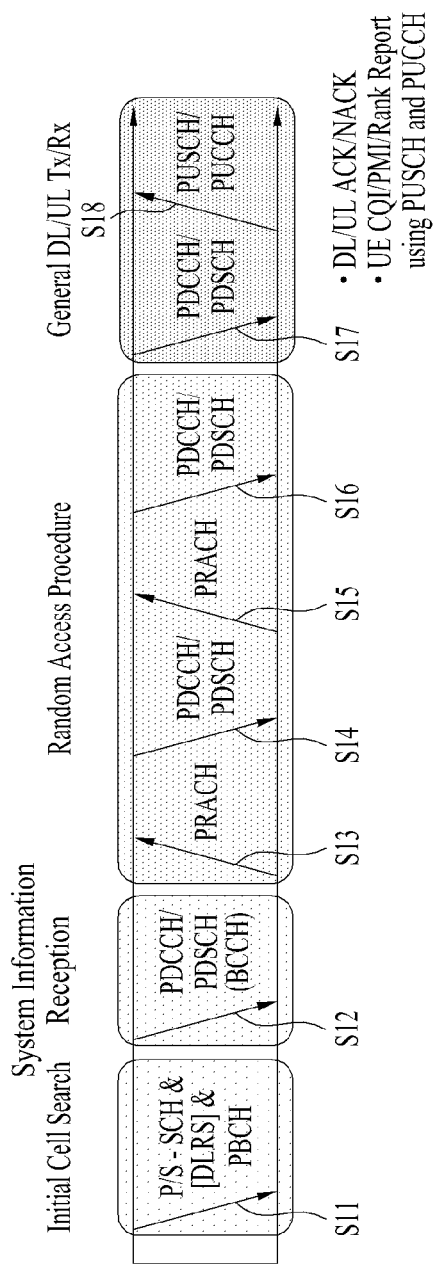
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
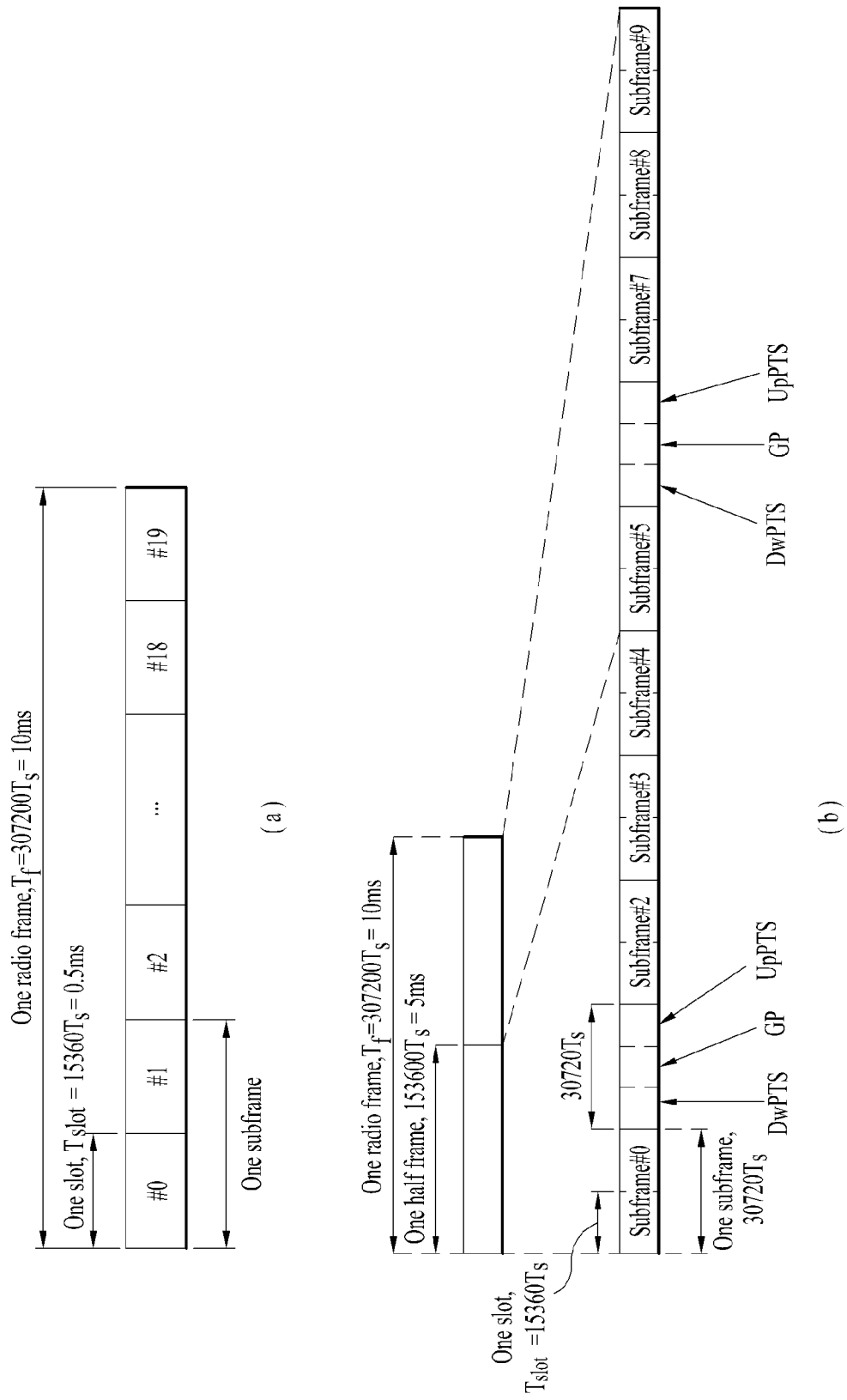
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10$^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
| | DwPTS | UpPTS | | DwPTS | UpPTS | |
| | | Normal cyclic prefix in uplink | Extended cyclic prefix in uplink | | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
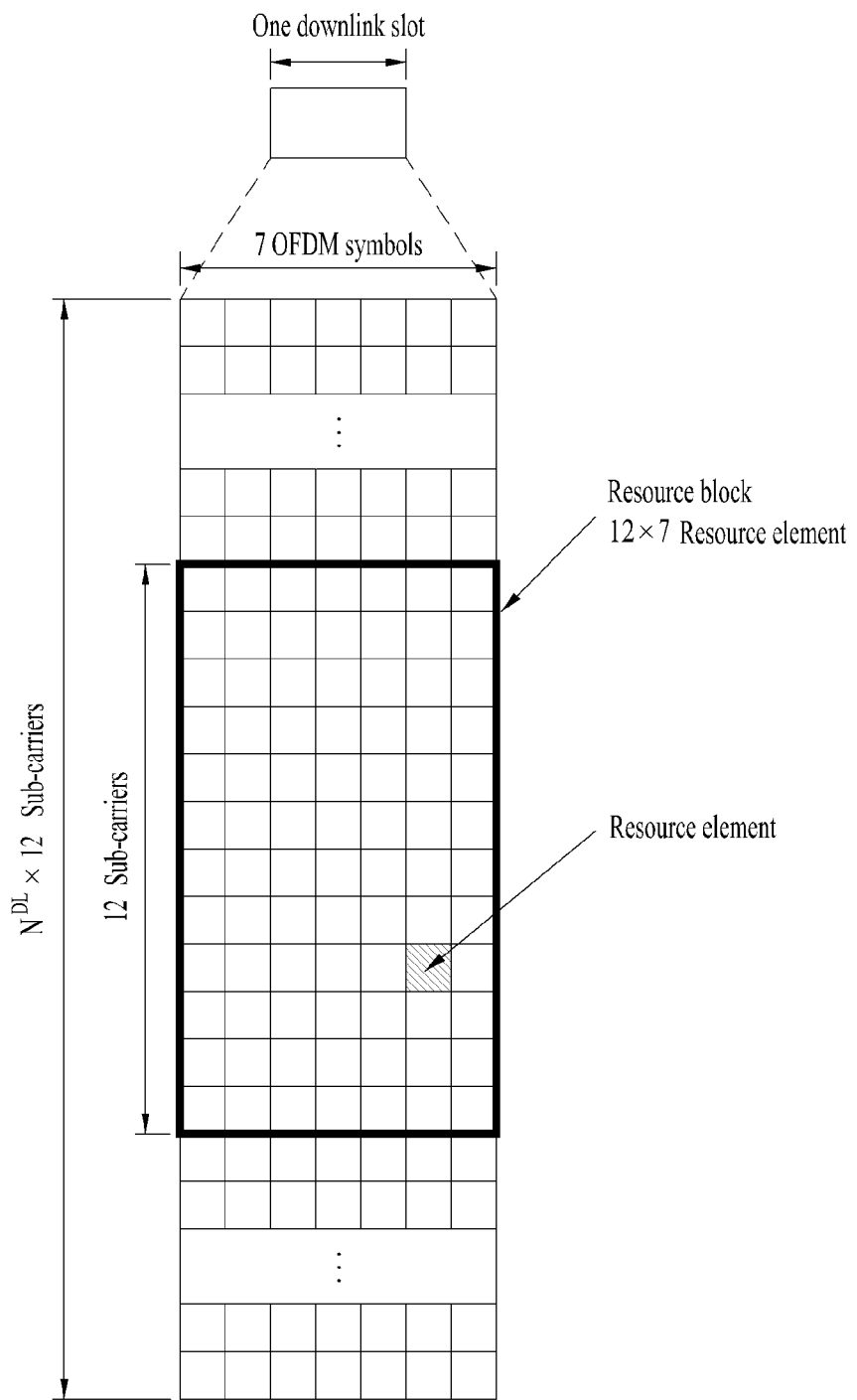
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
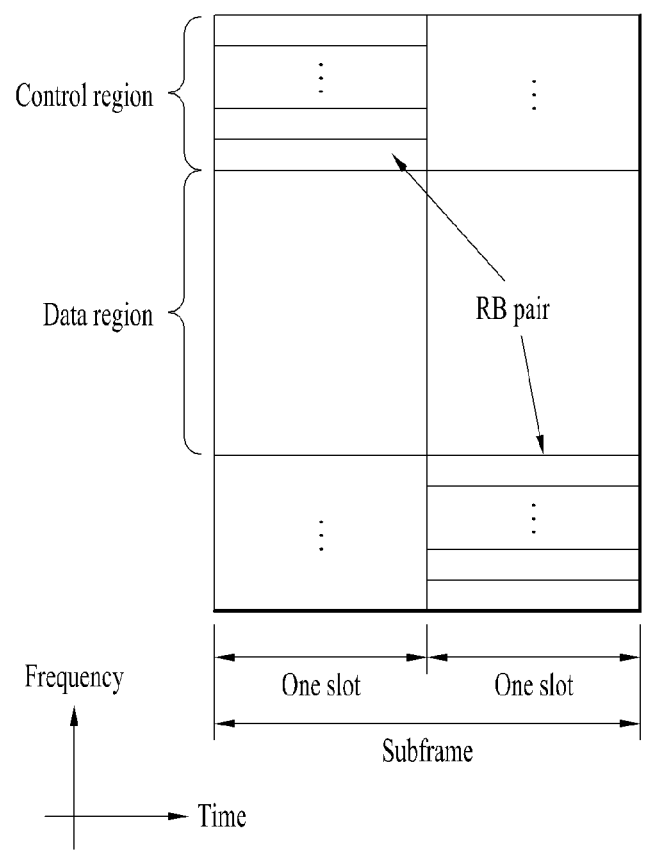
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
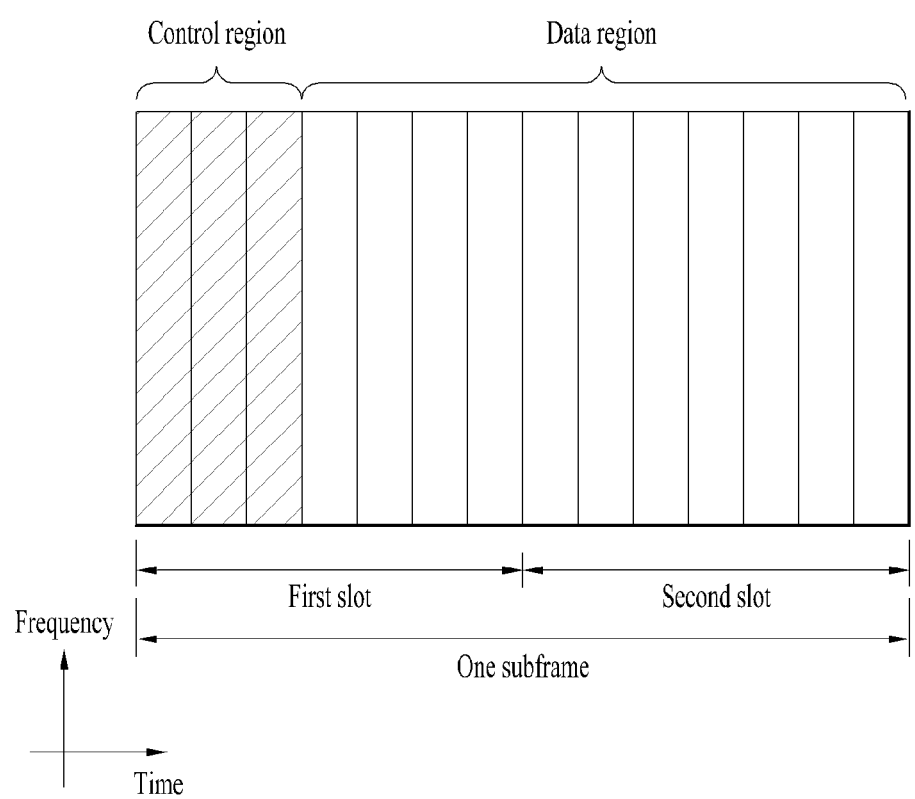
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.3. CSI Feedback

In the 3GPP LTE or LTE-A system, user equipment (UE) has been defined to report channel state information (CSI) to a base station (BS or eNB). Herein, the CSI refers to information indicating the quality of a radio channel (or link) formed between the UE and an antenna port.

For example, the CSI may include a rank indicator (RI), a precoding matrix indicator (PMI), and a channel quality indicator (CQI).

Here, RI denotes rank information about the corresponding channel, which means the number of streams that the UE receives through the same time-frequency resource. This value is determined depending on the channel's Long Term Fading. Subsequently, the RI may be fed back to the BS by the UE, usually at a longer periodic interval than the PMI or CQI.

The PMI is a value reflecting the characteristics of a channel space and indicates a precoding index preferred by the UE based on a metric such as SINR.

The CQI is a value indicating the strength of a channel, and generally refers to a reception SINR that can be obtained when the BS uses the PMI.

In the 3GPP LTE or LTE-A system, the base station may set a plurality of CSI processes for the UE, and receive a report of the CSI for each process from the UE. Here, the CSI process is configured with a CSI-RS for specifying signal quality from the base station and a CSI-interference measurement (CSI-IM) resource for interference measurement.

1.4. RRM Measurement

The LTE system supports Radio Resource Management (RRM) operation including power control, scheduling, cell search, cell reselection, handover, radio link or connection monitoring, and connection establishment/re-establishment. In this case, a serving cell may request a UE to send RRM measurement information, which contains measurement values for performing the RRM operation. As a representative example, in the LTE system, the UE may measure cell search information, Reference Signal Received Power (RSRP), Reference Signal Received Quality (RSRQ), etc. for each cell and then report the measured information. Specifically, in the LTE system, the UE receives 'measConfig' for the RRM measurement from the serving cell through a higher layer signal and then measure RSRP or RSRQ according to information in 'measConfig'.

In the LTE system, the RSRP, RSRQ, and RSSI has been defined as follows.

The RSRP is defined as the linear average over the power contributions (in [W]) of the resource elements that carry cell-specific reference signals within the considered measurement frequency bandwidth. For example, for RSRP determination, the cell-specific reference signals $R_0$ shall be used. For RSRP determination, the cell-specific reference signals $R_0$ shall be used. If the UE can reliably detect that $R_1$ is available, it may use $R_1$ in addition to $R_0$ to determine RSRP.

The reference point for the RSRP shall be the antenna connector of the UE.

If receiver diversity is in use by the UE, the reported value shall not be lower than the corresponding RSRP of any of the individual diversity branches.

The RSRQ is defined as the ratio N×RSRP/(E-UTRA carrier RSSI), where N is the number of RBs of the E-UTRA carrier RSSI measurement bandwidth. The measurements in the numerator and denominator shall be made over the same set of resource blocks.

The E-UTRA carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

The RSSI is defined as the received wide band power, including thermal noise and noise generated in the receiver, within the bandwidth defined by the receiver pulse shaping filter.

The reference point for the measurement shall be the antenna connector of the UE.

If receiver diversity is in use by the UE, the reported value shall not be lower than the corresponding UTRA carrier RSSI of any of the individual receive antenna branches.

Based on the above-described definitions, in the case of intra-frequency measurement, a UE operating in the LTE system may measure the RSRP in a bandwidth indicated by an allowed measurement bandwidth related information element (IE) transmitted in system information block type 3 (SIB3). Meanwhile, in the case of inter-frequency measurement, the UE may measure the RSRP in a bandwidth corresponding to one of 6, 15, 25, 50, 75, 100 resource blocks (RBs) indicated by an allowed measurement bandwidth related IE transmitted in SIBS. Alternatively, if there is no IE, the UE may measure the RSRP in the entire downlink (DL) system frequency bandwidth as the default operation.

Upon receiving information on the allowed measurement bandwidth, the UE may regard the corresponding value as the maximum measurement bandwidth and then freely measure the RSRP value within the corresponding value. However, if the serving cell transmits an IE defined as WB-RSRQ to the UE and sets the allowed measurement bandwidth to be equal to or greater than 50 RBs, the UE should calculate the RSRP value for the entire allowed measurement bandwidth. Meanwhile, when intending to the RSSI, the UE measures the RSSI using a frequency band of the UE's receiver according to the definition of RSSI bandwidth.

2. LTE-U System

2.1 LTE-U System Configuration

Hereinafter, methods for transmitting and receiving data in a CA environment of an LTE-A band corresponding to a licensed band and an unlicensed band will be described. In the embodiments of the present disclosure, an LTE-U system means an LTE system that supports such a CA status of a licensed band and an unlicensed band. A WiFi band or Bluetooth (BT) band may be used as the unlicensed band. LTE-A system operating on an unlicensed band is referred to as LAA (Licensed Assisted Access) and the LAA may correspond to a scheme of performing data transmission/reception in an unlicensed band using a combination with a licensed band.

Figure 6:
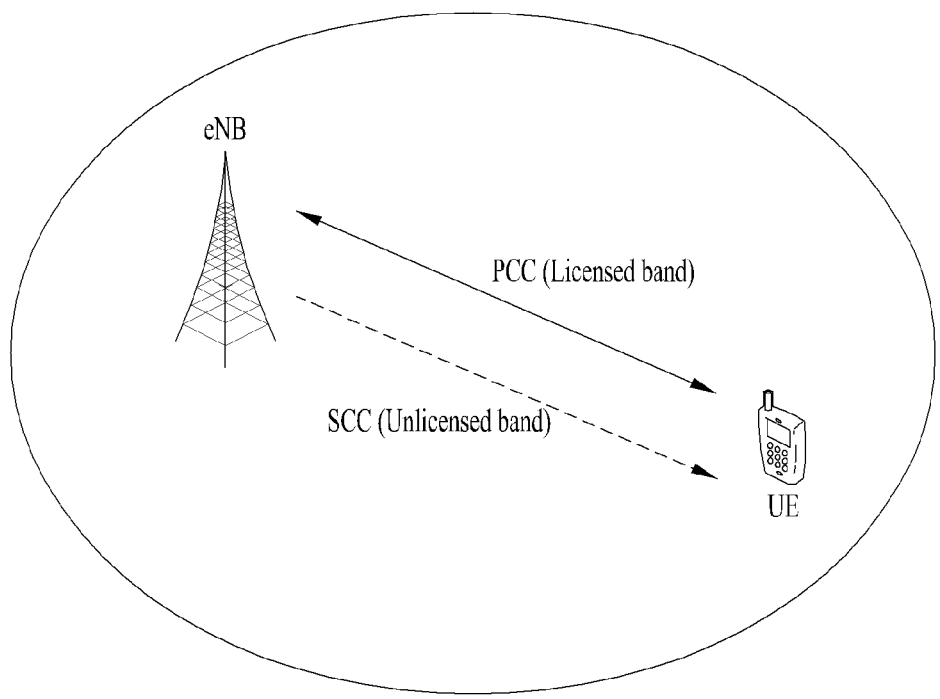
FIG. 6 is a diagram illustrating an exemplary carrier aggregation (CA) environment supported in a long term evolution-unlicensed (LTE-U) system.

FIG. 6 illustrates an example of a CA environment supported in an LTE-U system.

Hereinafter, for convenience of description, it is assumed that a UE is configured to perform wireless communication in each of a licensed band and an unlicensed band by using two CCs. The methods which will be described hereinafter may be applied to even a case where three or more CCs are configured for a UE.

In the embodiments of the present disclosure, it is assumed that a carrier of the licensed band may be a primary CC (PCC or PCell), and a carrier of the unlicensed band may be a secondary CC (SCC or SCell). However, the embodiments of the present disclosure may be applied to even a case where a plurality of licensed bands and a plurality of unlicensed bands are used in a carrier aggregation method. Also, the methods suggested in the present disclosure may be applied to even a 3GPP LTE system and another system.

In FIG. 6, one eNB supports both a licensed band and an unlicensed band. That is, the UE may transmit and receive control information and data through the PCC which is a licensed band, and may also transmit and receive control information and data through the SCC which is an unlicensed band. However, the status shown in FIG. 6 is only example, and the embodiments of the present disclosure may be applied to even a CA environment that one UE accesses a plurality of eNBs.

For example, the UE may configure a macro eNB (M-eNB) and a PCell, and may configure a small eNB (S-eNB) and an SCell. At this time, the macro eNB and the small eNB may be connected with each other through a backhaul network.

In the embodiments of the present disclosure, the unlicensed band may be operated in a contention-based random access method. At this time, the eNB that supports the unlicensed band may perform a Carrier Sensing (CS) procedure prior to data transmission and reception. The CS procedure determines whether a corresponding band is reserved by another entity.

For example, the eNB of the SCell checks whether a current channel is busy or idle. If it is determined that the corresponding band is idle state, the eNB may transmit a scheduling grant to the UE to allocate a resource through (E)PDCCH of the PCell in case of a cross carrier scheduling mode and through PDCCH of the SCell in case of a self-scheduling mode, and may try data transmission and reception.

At this time, the eNB may configure a TxOP including N consecutive subframes. In this case, a value of N and a use of the N subframes may previously be notified from the eNB to the UE through higher layer signaling through the PCell or through a physical control channel or physical data channel.

2.2 Carrier Sensing (CS) Procedure

In embodiments of the present disclosure, a CS procedure may be called a Clear Channel Assessment (CCA) procedure. In the CCA procedure, it may be determined whether a channel is busy or idle based on a predetermined CCA threshold or a CCA threshold configured by higher-layer signaling. For example, if energy higher than the CCA threshold is detected in an unlicensed band, SCell, it may be determined that the channel is busy or idle. If the channel is determined to be idle, an eNB may start signal transmission in the SCell. This procedure may be referred to as LBT.

Figure 7:
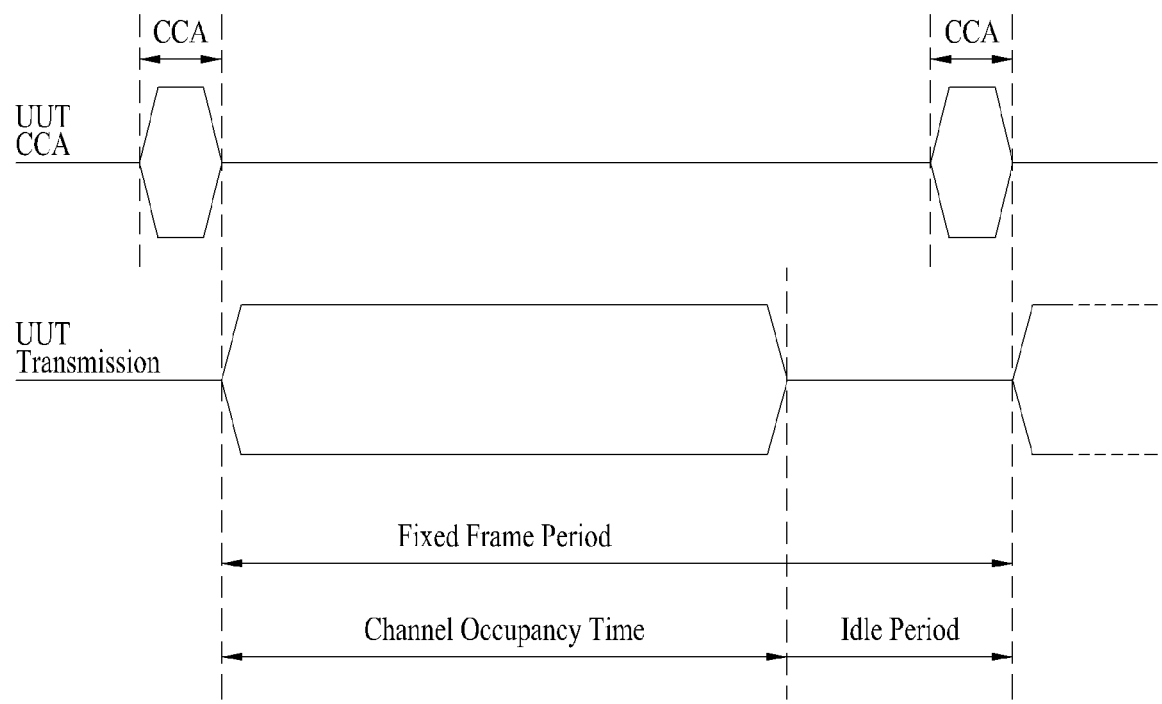
FIG. 7 is a diagram illustrating an exemplary frame based equipment (FBE) operation as one of listen-before-talk (LBT) operations.

FIG. 7 is a view illustrating an exemplary Frame Based Equipment (FBE) operation as one of LBT operations.

The European Telecommunication Standards Institute (ETSI) regulation (EN 301 893 V1.7.1) defines two LBT operations, Frame Based Equipment (FBE) and Load Based Equipment (LBE). In FBE, one fixed frame is comprised of a channel occupancy time (e.g., 1 to 10 ms) being a time period during which a communication node succeeding in channel access may continue transmission, and an idle period being at least 5% of the channel occupancy time, and CCA is defined as an operation for monitoring a channel during a CCA slot (at least 20 µs) at the end of the idle period.

A communication node periodically performs CCA on a per-fixed frame basis. If the channel is unoccupied, the communication node transmits data during the channel occupancy time. On the contrary, if the channel is occupied, the communication node defers the transmission and waits until the CCA slot of the next period.

Figure 8:
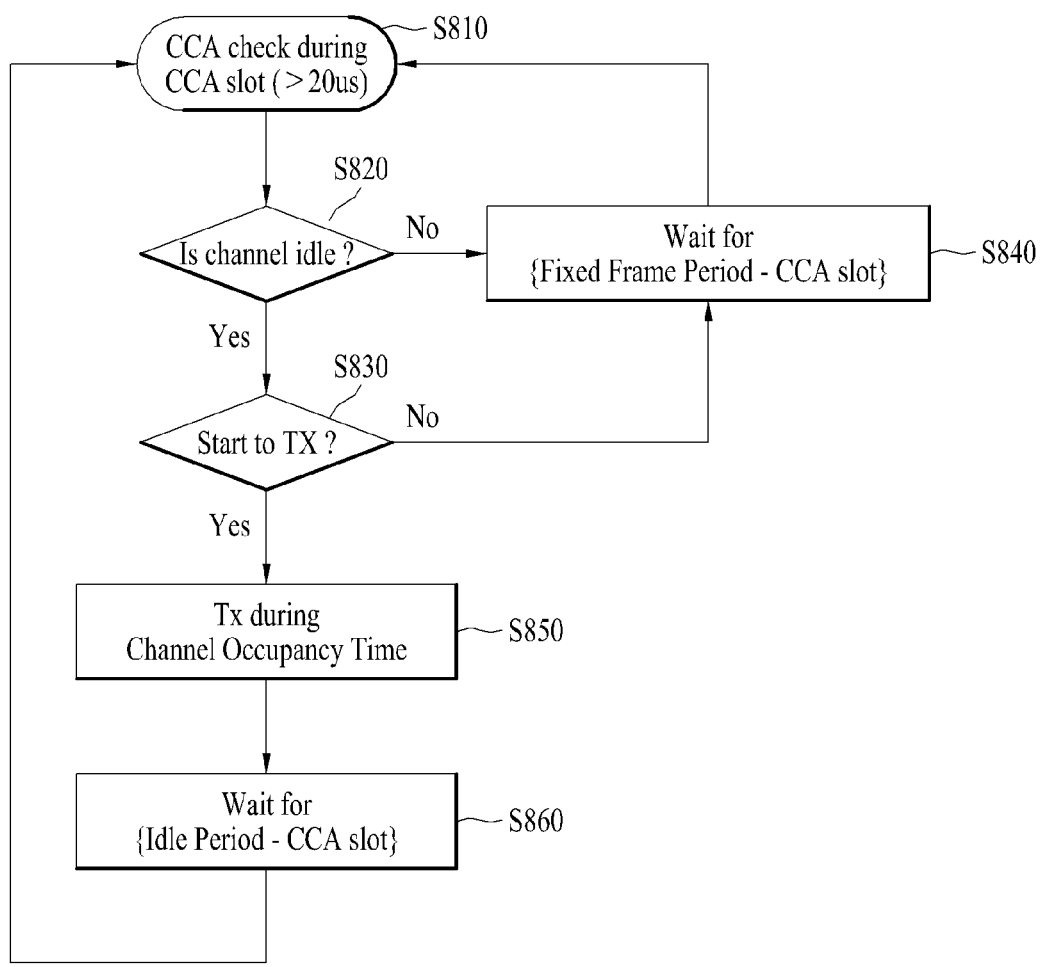
FIG. 8 is a block diagram illustrating the FBE operation.

FIG. 8 is a block diagram illustrating the FBE operation.

Referring to FIG. 8, a communication node (i.e., eNB) managing an SCell performs CCA during a CCA slot [S810]. If the channel is idle [S820], the communication node performs data transmission (Tx) [S830]. If the channel is busy, the communication node waits for a time period calculated by subtracting the CCA slot from a fixed frame period, and then resumes CCA [S840].

The communication node transmits data during the channel occupancy time [S850]. Upon completion of the data transmission, the communication node waits for a time period calculated by subtracting the CCA slot from the idle period [S860], and then resumes CCA [S810]. If the channel is idle but the communication node has no transmission data, the communication node waits for the time period calculated by subtracting the CCA slot from the fixed frame period [S840], and then resumes CCA [S810].

FIG. 9 is a view illustrating an exemplary LBE operation as one of the LBT operations.

Referring to FIG. 9(a), in LBE, the communication node first sets q (q∈{4, 5, . . . , 32}) and then performs CCA during one CCA slot.

FIG. 9(b) is a block diagram illustrating the LBE operation. The LBE operation will be described with reference to FIG. 9(b).

The communication node may perform CCA during a CCA slot [S910]. If the channel is unoccupied in a first CCA slot [S920], the communication node may transmit data by securing a time period of up to (13/32)q ms [S930].

On the contrary, if the channel is occupied in the first CCA slot, the communication node selects N (N∈{1, 2, . . . , q}) arbitrarily (i.e., randomly) and stores the selected N value as an initial count. Then, the communication node senses a channel state on a CCA slot basis. Each time the channel is unoccupied in one specific CCA slot, the communication node decrements the count by 1. If the count is 0, the communication node may transmit data by securing a time period of up to (13/32)q ms [S940].

2.3 Discontinuous Transmission in DL

When discontinuous transmission is performed on an unlicensed carrier having a limited maximum transmission period, the discontinuous transmission may influence on several functions necessary for performing an operation of LTE system. The several functions can be supported by one or more signals transmitted at a starting part of discontinuous LAA DL transmission. The functions supported by the signals include such a function as AGC configuration, channel reservation, and the like.

When a signal is transmitted by an LAA node, channel reservation has a meaning of transmitting signals via channels, which are occupied to transmit a signal to other nodes, after channel access is performed via a successful LBT operation.

The functions, which are supported by one or more signals necessary for performing an LAA operation including discontinuous DL transmission, include a function for detecting LAA DL transmission transmitted by a UE and a function for synchronizing frequency and time. In this case, the requirement of the functions does not mean that other available functions are excluded. The functions can be supported by other methods.

2.3.1 Time and Frequency Synchronization

A design target recommended by LAA system is to support a UE to make the UE obtain time and frequency synchronization via a discovery signal for measuring RRM (radio resource management) and each of reference signals included in DL transmission bursts, or a combination thereof. The discovery signal for measuring RRM transmitted from a serving cell can be used for obtaining coarse time or frequency synchronization.

2.3.2 DL Transmission Timing

When a DL LAA is designed, it may follow a CA timing relation between serving cells combined by CA, which is defined in LTE-A system (Rel-12 or earlier), for subframe boundary adjustment. Yet, it does not mean that a base station starts DL transmission only at a subframe boundary. Although all OFDM symbols are unavailable in a subframe, LAA system can support PDSCH transmission according to a result of an LBT operation. In this case, it is required to support transmission of control information necessary for performing the PDSCH transmission.

2.4 Measuring and Reporting RRM

LTE-A system can transmit a discovery signal at a start point for supporting RRM functions including a function for detecting a cell. In this case, the discovery signal can be referred to as a discovery reference signal (DRS). In order to support the RRM functions for LAA, the discovery signal of the LTE-A system and transmission/reception functions of the discovery signal can be applied in a manner of being changed.

2.4.1 Discovery Reference Signal (DRS)

A DRS of LTE-A system is designed to support on/off operations of a small cell. In this case, off small cells correspond to a state that most of functions are turned off except a periodic transmission of a DRS. DRSs are transmitted at a DRS transmission occasion with a period of 40, 80, or 160 ms. A DMTC (discovery measurement timing configuration) corresponds to a time period capable of anticipating a DRS received by a UE. The DRS transmission occasion may occur at any point in the DMTC. A UE can anticipate that a DRS is continuously transmitted from a cell allocated to the UE with a corresponding interval.

If a DRS of LTE-A system is used in LAA system, it may bring new constraints. For example, although transmission of a DRS such as a very short control transmission without LBT can be permitted in several regions, a short control transmission without LBT is not permitted in other several regions. Hence, a DRS transmission in the LAA system may become a target of LBT.

When a DRS is transmitted, if LBT is applied to the DRS, similar to a DRS transmitted in LTE-A system, the DRS may not be transmitted by a periodic scheme. In particular, it may consider two schemes described in the following to transmit a DRS in the LAA system.

As a first scheme, a DRS is transmitted at a fixed position only in a DMTC configured on the basis of a condition of LBT.

As a second scheme, a DRS transmission is permitted at one or more different time positions in a DMTC configured on the basis of a condition of LBT.

As a different aspect of the second scheme, the number of time positions can be restricted to one time position in a subframe. If it is more profitable, DRS transmission can be permitted at the outside of a configured DMTC as well as DRS transmission performed in the DMTC.

Figure 10:
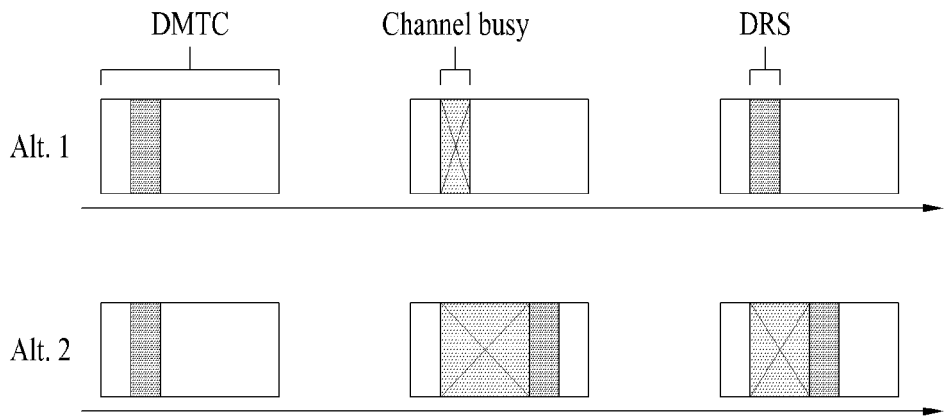
FIG. 10 is a diagram illustrating methods of transmitting a discovery reference signal (DRS) supported in a licensed assisted access (LAA) system.

FIG. 10 is a diagram for explaining DRS transmission methods supported by LAA system.

Referring to FIG. 10, the upper part of FIG. 10 shows the aforementioned first scheme for transmitting a DRS and the bottom part of FIG. 10 shows the aforementioned second scheme for transmitting a DRS. In particular, in case of the first scheme, a UE can receive a DRS at a position determined in a DMTC period only. On the contrary, in case of the second scheme, a UE can receive a DRS at a random position in a DMTC period.

In LTE-A system, when a UE performs RRM measurement based on DRS transmission, the UE can perform single RRM measurement based on a plurality of DRS occasions. In case of using a DRS in LAA system, due to the constraint of LBT, it is difficult to guarantee that the DRS is transmitted at a specific position. Even though a DRS is not actually transmitted from a base station, if a UE assumes that the DRS exists, quality of an RRM measurement result reported by the UE can be deteriorated. Hence, when LAA DRS is designed, it is necessary to permit the existence of a DRS to be detected in a single DRS occasion. By doing so, it may be able to make the UE combine the existence of the DRS with RRM measurement, which is performed on successfully detected DRS occasions only.

Signals including a DRS do not guarantee DRS transmissions adjacent in time. In particular, if there is no data transmission in subframes accompanied with a DRS, there may exist OFDM symbols in which a physical signal is not transmitted. While operating in an unlicensed band, other nodes may sense that a corresponding channel is in an idle state during a silence period between DRS transmissions. In order to avoid the abovementioned problem, it is preferable that transmission bursts including a DRS signal are configured by adjacent OFDM symbols in which several signals are transmitted.

2.5 Channel Access Procedure and Contention Window Adjustment Procedure

In the following, the aforementioned channel access procedure and the contention window adjustment procedure are explained in the aspect of a transmission node.

Figure 11:
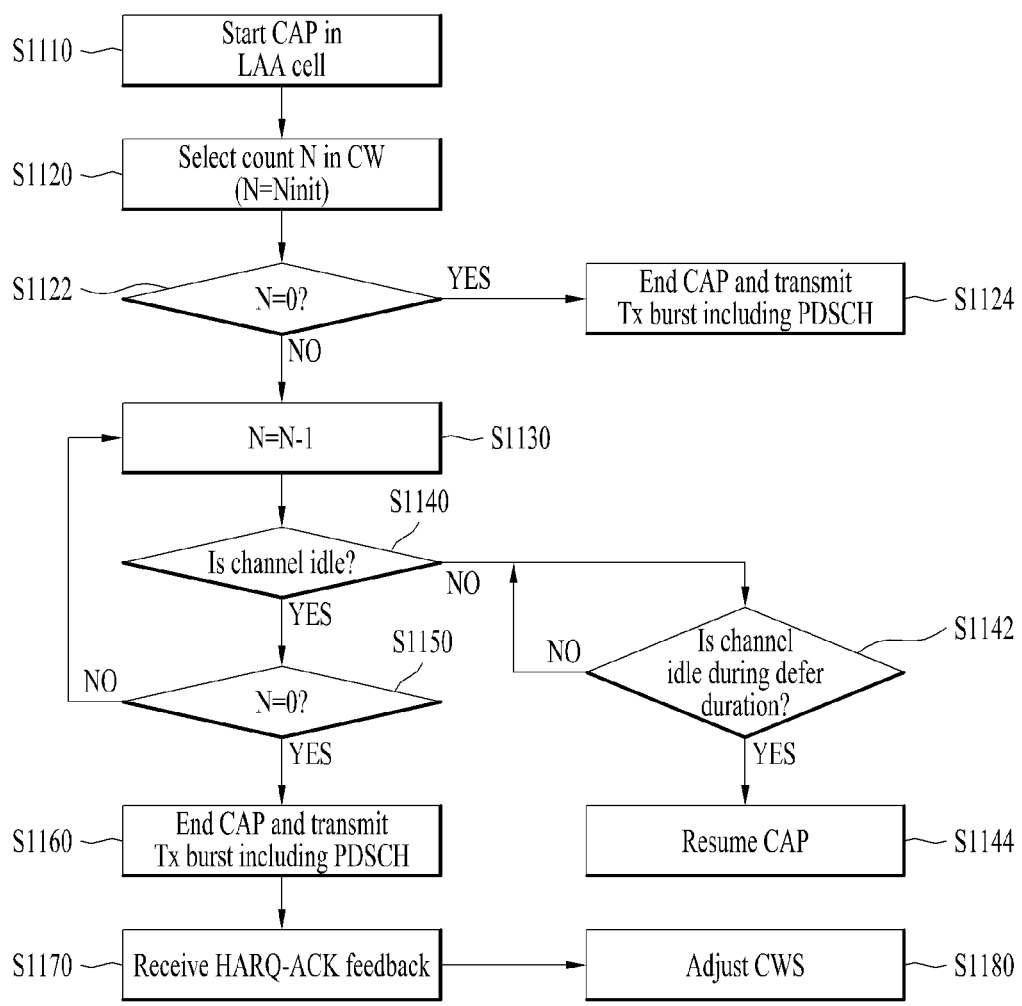
FIG. 11 is a diagram illustrating a channel access procedure (CAP) and contention window adjustment (CWA)

FIG. 11 is a flowchart for explaining CAP and CWA.

In order for an LTE transmission node (e.g., a base station) to operate in LAA Scell(s) corresponding to an unlicensed band cell for DL transmission, it may initiate a channel access procedure (CAP) [S1110].

The base station can randomly select a back-off counter N from a contention window (CW). In this case, the N is configured by an initial value Ninit [S1120]. The Ninit is randomly selected from among values ranging from 0 to $CW_p$.

Subsequently, if the back-off counter value (N) corresponds to 0 [S1122], the base station terminates the CAP and performs Tx burst transmission including PSCH [S1124]. On the contrary, if the back-off value is not 0, the base station reduces the back-off counter value by 1 [S1130].

The base station checks whether or not a channel of the LAA Scell(s) is in an idle state [S1140]. If the channel is in the idle state, the base station checks whether or not the back-off value corresponds to 0 [S1150]. The base station repeatedly checks whether or not the channel is in the idle state until the back-off value becomes 0 while reducing the back-off counter value by 1.

In the step S1140, if the channel is not in the idle state i.e., if the channel is in a busy state, the base station checks whether or not the channel is in the idle state during a defer duration (more than 15 usec) longer than a slot duration (e.g., 9 usec) [S1142]. If the channel is in the idle state during the defer duration, the base station can resume the CAP [S1144]. For example, when the back-off counter value Ninit corresponds to 10, if the channel state is determined as busy after the back-off counter value is reduced to 5, the base station senses the channel during the defer duration and determines whether or not the channel is in the idle state. In this case, if the channel is in the idle state during the defer duration, the base station performs the CAP again from the back-off counter value 5 (or, from the back-off counter value 4 by reducing the value by 1) rather than configures the back-off counter value Ninit. On the contrary, if the channel is in the busy state during the defer duration, the base station performs the step S1142 again to check whether or not the channel is in the idle state during a new defer duration.

Referring back to FIG. 11, the base station checks whether or not the back-off counter value (N) becomes 0 [S1150]. If the back-off counter value (N) becomes 0, the base station terminates the CAP and may be able to transmit a Tx burst including PDSCH.

The base station can receive HARQ-ACK information from a UE in response to the Tx burst [S1170]. The base station can adjust a CWS (contention window size) based on the HARQ-ACK information received from the UE [S1180].

In the step S1180, as a method of adjusting the CWS, the base station can adjust the CWS based on HARQ-ACK information on a first subframe of a most recently transmitted Tx burst (i.e., a start subframe of the Tx burst).

In this case, the base station can set an initial CW to each priority class before the CWP is performed. Subsequently, if a probability that HARQ-ACK values corresponding to PDSCH transmitted in a reference subframe are determined as NACK is equal to or greater than 80%, the base station increases CW values set to each priority class to a next higher priority.

In the step S1160, PDSCH can be assigned by a self-carrier scheduling scheme or a cross-carrier scheduling scheme. If the PDSCH is assigned by the self-carrier scheduling scheme, the base station counts DTX, NACK/DTX, or ANY state among the HARQ-ACK information fed back by the UE as NACK. If the PDSCH is assigned by the cross-carrier scheduling scheme, the base station counts the NACK/DTX and the ANY states as NACK and does not count the DTX state as NACK among the HARQ-ACK information fed back by the UE.

If bundling is performed over M (M>=2) number of subframes and bundled HARQ-ACK information is received, the base station may consider the bundled HARQ-ACK information as M number of HARQ-ACK responses. In this case, it is preferable that a reference subframe is included in the M number of bundled subframes.

2.6. Channel Access Priory Class

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

As shown in Table 2, in Rel-13 LAA system, 4 channel access priority classes are defined in total. And, a length of a defer period, a CWS, MCOT (maximum channel occupancy time), and the like are defined according to each of the channel access priority classes. Hence, when an eNB transmits a downlink signal via an unlicensed band, the eNB performs random backoff by utilizing LBT parameters determined according to a channel access priority class and may be then able to access a channel during limited maximum transmission time only after the random backoff is completed.

For example, in case of the channel access priority class 1/2/3/4, the maximum channel occupancy time (MCOT) is determined by 2/3/8/8 ms. The maximum channel occupancy time (MCOT) is determined by 2/3/10/10 ms in environment where other RAT such as Wi-Fi does not exists (e.g., by level of regulation).

As shown in Table 2, a set of CWSs capable of being configured according to a class is defined. One of points different from Wi-Fi system is in that a different backoff counter value is not defined according to a channel access priority class and LBT is performed using a single backoff counter value (this is referred to as single engine LBT).

For example, when an eNB intends to access a channel via an LBT operation of class 3, since CWmin (=15) is configured as an initial CWS, the eNB performs random backoff by randomly selecting an integer from among numbers ranging from 0 to 15. If a backoff counter value becomes 0, the eNB starts DL Tx and randomly selects a new backoff counter for a next Tx burst after the DL Tx burst is completed. In this case, if an event for increasing a CWS is triggered, the eNB increases a size of the CWS to 31 corresponding to a next size, randomly selects an integer from among numbers ranging from 0 to 31, and performs random backoff.

In this case, when a CWS of the class 3 is increased, CWSs of all classes are increased as well. In particular, if the CW of the class 3 becomes 31, a CWS of a class 1/2/4 becomes 7/15/31. If an event for decreasing a CWS is triggered, CWS values of all classes are initialized by CWmin irrespective of a CWS value of the triggering timing.

2.7. Subframe Structure Applicable to LAA System

Figure 12:
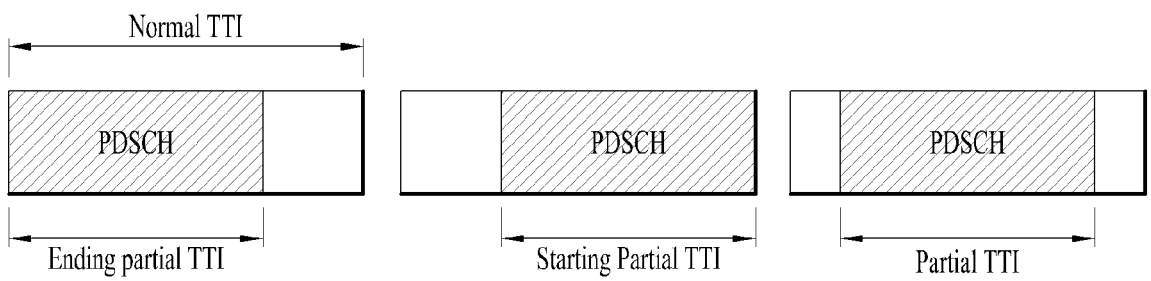
FIG. 12 is a diagram illustrating a partial transmission time interval (TTI) or a partial subframe, which is applicable to the present invention.

FIG. 12 is a diagram illustrating a partial TTI or a partial subframe applicable to the present invention.

In Rel-13 LAA system, MCOT is utilized as much as possible when DL Tx burst is transmitted. In order to support consecutive transmission, a partial TTI, which is defined as DwPTS, is introduced. The partial TTI (or partial subframe) corresponds to a section in which a signal is transmitted as much as a length shorter than a legacy TTI (e.g., 1 ms) when PDSCH is transmitted.

In the present invention, for clarity, a starting partial TTI or a starting partial subframe corresponds to a form that a part of symbols positioned at the fore part of a subframe are emptied out. An ending partial TTI or an ending partial subframe corresponds to a form that a part of symbols positioned at the rear part of a subframe are emptied out. (On the contrary, an intact TTI is referred to as a normal TTI or a full TTI.)

FIG. 12 illustrates various types of the aforementioned partial TTI. The first drawing of FIG. 12 illustrates an ending partial TTI (or subframe) and the second drawing illustrates a starting partial TTI (or subframe). The third drawing of FIG. 12 illustrates a partial TTI (or subframe) that a part of symbols positioned at the fore part and the rear part of a subframe are emptied out. In this case, when signal transmission is excluded from a normal TTI, a time section during which the signal transmission is excluded is referred to as a transmission gap (TX gap).

Although the present invention is explained on the basis of a DL operation in FIG. 12, the present invention can also be identically applied to a UL operation. For example, a partial TTI structure shown in FIG. 12 can be applied to a form of transmitting PUCCH or PUSCH as well.

3. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present invention, for simplicity, this technology will be referred to as NewRAT or NR (New Radio).

3.1. Self-Contained Subframe Structure

Figure 13:
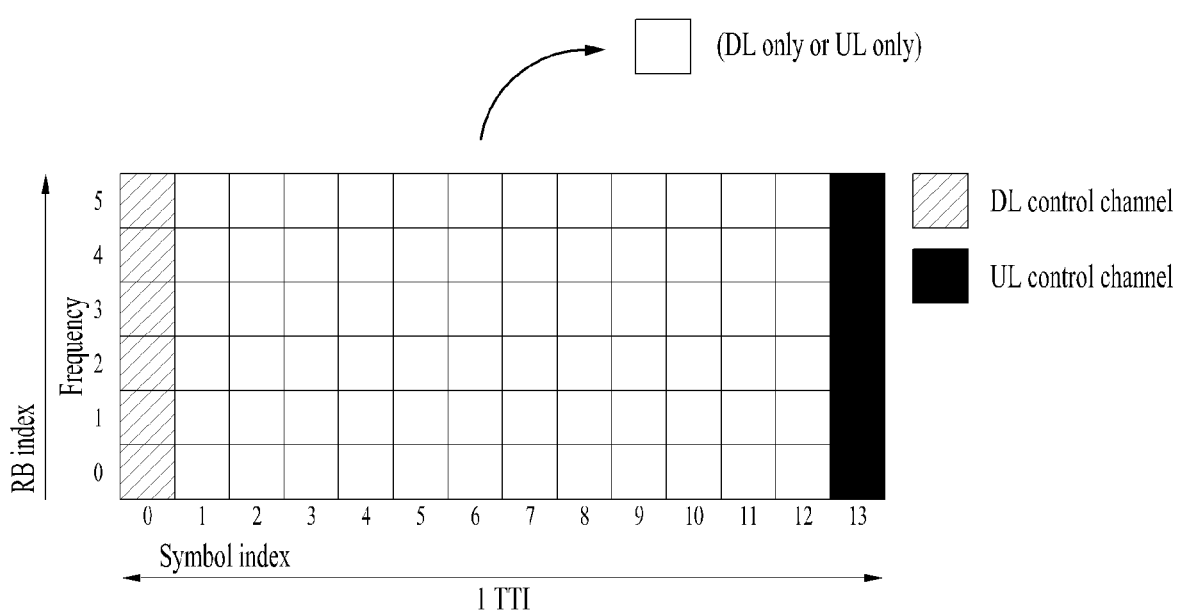
FIG. 13 is a diagram illustrating a self-contained subframe structure applicable to the present invention.

FIG. 13 is a diagram illustrating a self-contained subframe structure applicable to the present invention.

In the NR system to which the present invention is applicable, a self-contained subframe structure as shown in FIG. 13 is proposed in order to minimize data transmission latency in the TDD system.

In FIG. 13, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone, as shown in FIG. 13.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

3.2. OFDM Numerology

The NR system uses the OFDM transmission scheme or a similar transmission scheme. Here, the NR system may typically have the OFDM numerology as shown in Table 3.

TABLE 3

| Parameter | Value |
| --- | --- |
| Subcarrier-spacing ($\Delta f$) | 751 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 4. Specifically, as disclosed in Table 4, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 4 are merely an example that is applicable to the NR system according to the present invention, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 4 are merely an example that is applicable to the NR system according to the present invention, and the values thereof may depend on the implementation method.

TABLE 4

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 us/ 4.69 us | 2.60 us/ 2.34 us | 1.30 us/ 1.17 us | 0.65 us/ 0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

3.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 14:
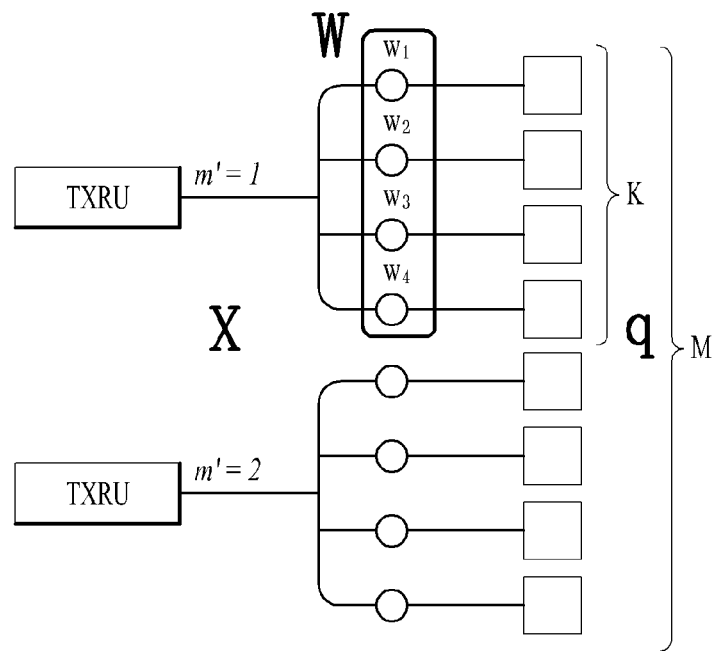
FIGS. 14 and 15 are diagrams illustrating representative methods for connecting TXRUs to antenna elements.
Figure 15:
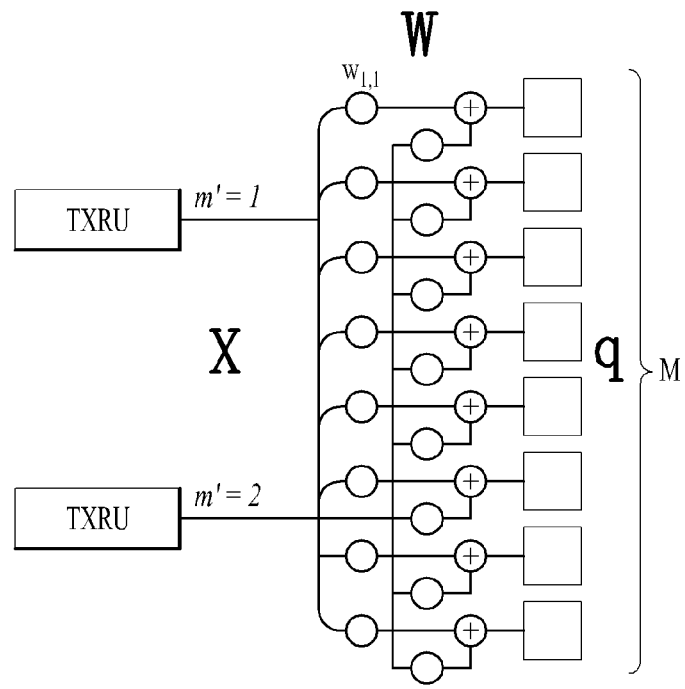

FIGS. 14 and 15 are diagrams illustrating representative methods for connecting TXRUs to antenna elements. Here, the TXRU virtualization model represents the relationship between TXRU output signals and antenna element output signals.

FIG. 14 shows a method for connecting TXRUs to sub-arrays. In FIG. 14, one antenna element is connected to one TXRU.

Meanwhile, FIG. 15 shows a method for connecting all TXRUs to all antenna elements. In FIG. 15, all antenna element are connected to all TXRUs. In this case, separate addition units are required to connect all antenna elements to all TXRUs as shown in FIG. 15.

In FIGS. 14 and 15, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 14 has a disadvantage in that it is difficult to achieve beamforming focusing but has an advantage in that all antennas can be configured at low cost.

On the contrary, the configuration shown in FIG. 15 is advantageous in that beamforming focusing can be easily achieved. However, since all antenna elements are connected to the TXRU, it has a disadvantage of high cost.

4. Proposed Embodiments

Hereinafter, a sounding reference signal (SRS) transmission method and an LBT method for PRACH transmission according to the present invention will be described in detail based on the above-described configurations.

4.1. SRS Transmission Method

In a legacy LTE system, an SRS is used for UL channel state measurement and/or DL channel state measurement (using channel reciprocity in a TDD system). In this case, the SRS may be transmitted in the last symbol of a specific subframe. Rate matching may be applied to UL data transmitted in the subframe in which the SRS is transmitted with the last symbol being empty.

In an NR system to which the present invention is applicable, UL control information (or a UL control channel) and UL data (or a UL data channel) may be transmitted by being time-division-multiplexed (TDMed) with each other as illustrated in FIG. 13. Assuming that the SRS and the UL data are transmitted by being TDMed in a similar manner to the legacy LTE system, the UL control information (or UL control channel) and the SRS may be multiplexed in the same time region prior to transmission, for more efficient transmission. The above example, however, may have a disadvantage of being insufficient in resources on which the SRS can be transmitted.

Therefore, the present invention proposes a method of transmitting the SRS in a UL data region, unlike the legacy LTE system, in order to solve the above-described problem.

Hereinafter, a UL SRS will be referred to as UL_SS for convenience of description.

Figure 16:
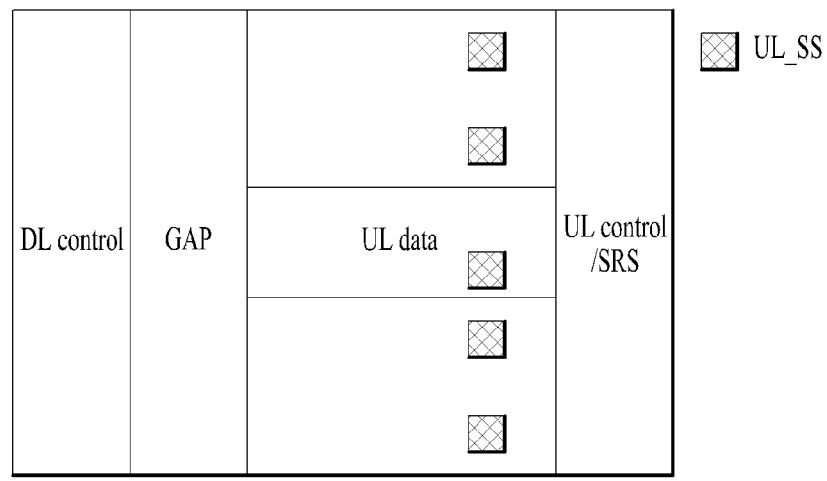
FIG. 16 is a diagram schematically illustrating an SRS transmission method according to the present invention.

FIG. 16 is a diagram schematically illustrating an SRS transmission method according to the present invention.

As illustrated in FIG. 16, the UE may transmit UL_SS in a UL data region, rather than a UL control/SRS region which is TDMed with the UL data region.

When an eNB or a new generation Node B (gNB) (for convenience of description, referred to as a gNB) configures a reception (Rx) beam direction in an analog beamforming situation, the above method may be used when the gNB desires to differently configure Rx beam directions of the UL control/SRS region and the UL data region. In addition, if the same UE desires to transmit an SRS in multiple transmission (Tx) beam directions, multiple symbols may be needed but the SRS may be embedded or included in the UL data region, so that resource efficiency may be increased.

Hereinbelow, a UL_SS configuration method and a power control method according to the present invention will be described in detail.

4.1.1. UL_SS Configuration Method

First, according to the present invention, the UE may require the following information in order to configure UL_SS.

- Resource Unit (RU): RU information represents an RU constituting UL_SS in a specific time interval (e.g., a subframe or a slot) and a frequency resource (e.g., one RB consisting of a predetermined number of subcarriers). For example, two REs per antenna port may be defined as the RU information. The two REs may be defined as contiguous resources in the frequency domain or the time domain.
- Bandwidth: Bandwidth information may be defined as a maximum unit in which RUs constituting one UL_SS can be spanned in the frequency domain. The bandwidth information may be equal to a total system band or a frequency region of actually scheduled UL data or may be limited to a partial system band.
- Periodicity and/or offset: Periodicity and/or offset value information represents periodicity and offset value information by which UL_SS can be configured. In this case, even if UL_SS is configured by a specific periodicity/offset value, all configured UL_SSs may not always be valid. As an example, only UL_SS which is indicated as being valid by validity information, which will be described later, may be regarded as being valid. If information such as the periodicity and/or offset value is not configured, all time intervals (e.g., subframes or slots) may be a candidate time interval for UL_SS configuration.
- Antenna port: Antenna port information represents information about the number of antenna ports configured for UL_SS.
- Sequence information: Sequence information represents sequence information regarding UL_SS. As an example, the sequence information may include information such as a root index, a cyclic shift, and/or an orthogonal cover code and/or sequence scrambling information.
- Non-zero power (NZP), zero power (ZP), and interference measurement resource (IMR): NZP, ZP, and IMR information represents information as to whether to carry power in configured UL_SS. For example, the information may use ZP UL_SS in order to consider UL_SS transmission of other UEs or to perform interference measurement of an eNB. UL_SS configured as the IMR may be used as a resource for measuring the amount of UE-to-UE interference (by coordination between eNBs). In this case, the UE may report the measured amount of interference to the eNB and the eNB may use reported information for inter-cell interference control.
- DL/UL information: DL/UL information may indicate whether UL_SS is configured by indicating whether a specific subframe (SF) is a DL or UL subframe. For example, when a time/frequency resource of configured UL_SS is the same as a time/frequency resource of a CSI-RS which is transmitted for CSI measurement in DL, the DL/UL information may indicate whether a DL CSI-RS is configured or UL_SS is configured for the specific SF by indicating whether the specific SF is a DL SF or a UL SF.
- Validity: Validity information indicates whether UL_SS is valid in a specific time interval (e.g., an SF or a slot) or whether an RU configured as a UL_SS resource is valid. For example, if the validity information indicates that UL_SS in a TTI in which UL data is transmitted is valid, the UE may transmit the UL data after performing rate matching in consideration of the UL_SS resource. Alternatively, upon not receiving the validity information, the UE may be configured to perform rate matching by always considering configured UL_SS. In addition, the validity information may be applied only to UL_SS configured by the periodicity and/or offset information.

One or more of the above-described various information may be preconfigured or may be configured by higher-layer signaling (e.g., Radio Resource Control (RRC) signaling) or dynamic signaling (e.g., first-layer (L1) signaling). In this case, it is desirable to UE-commonly (or UE group-commonly) transmit first-layer signaling in order to reduce signaling overhead.

According to a more specific embodiment, the gNB may configure information such as {RU, bandwidth, antenna port, sequence information, NZP/ZP} through RRC signaling for the UE. Assuming that time/frequency resources of the DL CSI-RS and UL_SS have been configured, the gNB may configure information such as {DL/UL, validity} through first-layer signaling for the UE.

Alternatively, the UE may implicitly acquire the DL/UL and/or validity information. That is, the UE may regard DL/UL information for a time interval (e.g., an SF or a slot) in which DL data is assigned as DL and regard DL/UL information for a time interval in which UL data is assigned as UL. For example, when the UE recognizes a specific time interval as DL (or UL), the UE may be aware that a DL CSI-RS (or UL_SS) configured in a corresponding time region is valid.

If UL_SS is configured by the periodicity and/or offset value, the UE may recognize that UL_SS configured in the nearest time interval after a timing at which first-layer signaling is received is valid. If UL_SS is not configured by the periodicity and/or offset value, the UE may recognize that UL_SS configured at a timing at which first-layer signaling is received is valid.

In the present invention, if the gNB can configure a DL CSI-RS resource and a UL_SS resource by completely equalizing the resources, this configuration may be more efficient in an NR frame structure in which DL/UL can be dynamically changed. In other words, if the gNB preconfigures a signal resource without distinguishing between use purposes of the signal resource, the use purposes of the signal resource may be dynamically determined according to whether a corresponding SF is a DL SF or a UL SF.

However, a system band for DL may differ from a system band for UL. In consideration of the fact that the maximum number of antenna ports and an antenna port multiplexing structure may differ according to DL or UL, the gNB may have difficulty in completely equalizing the DL CSI-RS resource and the UL_SS resource. Therefore, the gNB may configure the DL CSI-RS resource and the UL_SS resource to partially overlap or configure both resources to be completely separated. In this case, when the UE recognizes a specific time interval (e.g., an SF or a slot) as DL (or UL), the UE may regard the UL_SS resource (or DL CSI-RS resource) as being invalid and recognize that rate matching is not needed during DL data (or UL data) transmission and reception in the corresponding time interval.

4.1.2. Power Control Method

4.1.2.1. Case in which UL Data is Transmitted in a Symbol in which ZP UL_SS is Configured A rule may be made such that UL data carries much power in a symbol in which ZP UL_SS is configured. Alternatively, a rule may be made such that energy per resource element (EPRE) of UL data in other symbols is equally maintained even with respect to the symbol in which ZP UL_SS is configured so that gNB may assume the same power during signal reception. In this case, the above rule may be configured by higher-layer signaling or first-layer signaling.

4.1.2.2. Case in which UL Data and/or UL_SS is Transmitted in a Symbol in which NZP UL_SS is Transmitted A ratio value between UL data EPRE and UL_SS power (for convenience, referred to as P_SS) in a symbol in which NZP UL_SS is transmitted may be configured by higher-layer signaling or first-layer signaling. The P_SS value may be configured in consideration of capabilities of the UE such as a power amplifier characteristic of the UE. Alternatively, an absolute value of UL_SS power may be configured by higher-layer signaling or first-layer signaling regardless of the value of the UL data EPRE.

When the UE attempts to simultaneously perform UL transmission in multiple carriers in a carrier aggregation situation, the UE may undergo a power limited situation in which a total sum of allocated UL powers is greater than an available total power of the UE. In this case, the UE may attempt to perform UL transmission with lower power than actually allocated power by a power scaling rule.

Considering that UL_SS is transmitted for UL/DL channel state measurement, it is undesirable that the UE transmit UL_SS with power less than a specific threshold value. Accordingly, a minimum guaranteed power value of UL_SS may be configured for the UE. If the minimum guaranteed power value is not guaranteed, the UE may not attempt to perform UL_SS transmission in a corresponding symbol.

4.1.3. Additional Embodiment

As a method of extending a transmission region of an SRS, the UE may transmit the SRS at a resource location for a UL demodulation RS (DM-RS). The DM-RS may be transmitted by being TDMed with UL data or may be transmitted prior to transmission of the UL data for early decoding of the UL data.

In this case, the DM-RS may be transmitted through all antenna ports without applying precoding and the UL data may be transmitted through only actually scheduled antenna port(s) by applying precoding. Whether to apply the same precoding, which has been applied to the UL data, to the DM-RS or transmit the DM-RS through al (configured) antenna ports without applying precoding may be configured by higher-layer signaling or first-layer signaling. If the DM-RS is transmitted through all antenna ports without applying precoding and the UL data is transmitted through only actually scheduled antenna port(s) by applying precoding, the gNB may receive the DM-RS to estimate a channel per individual antenna port and then attempt to perform UL data demodulation using a channel to which precoding has been applied.

4.2. LBT Method for PRACH Transmission

Hereinafter, an LBT method that the UE performs for PRACH transmission in a wireless communication system supporting an unlicensed band as described earlier will be described.

4.2.1. LBT-Related Signaling

4.2.1.1. First LBT Signaling Method

When PRACH transmission is triggered by an indication through a PDCCH, the gNB or eNB may explicitly indicate an LBT type through DCI that triggers PRACH transmission.

In this case, the LBT type may indicate one of a category 4 based LBT method for performing random backoff (for convenience of description, referred to as LBT type 1), an LBT method for permitting signal transmission without performing random backoff if it is determined that a channel is idle during a predetermined time (e.g., 25 μsec) (for convenience of description, referred to as LBT type 2), and a method for not performing LBT (for convenience of description, referred to as No LBT).

Additionally, when contention-based PRACH transmission rather than the indication through the PDCCH (e.g., PDCCH order) is permitted in an unlicensed band (e.g., unlicensed spectrum), the LBT type may be configured by higher-layer signaling (e.g., RRC signaling, a master information block (MIB), or a system information block (SIB)).

4.2.1.2. Second LBT Signaling Method

The gNB or eNB may signal information about a staring and/or ending position of a PRACH to the UE.

Specifically, if PRACH transmission is triggered by the indication through the PDCCH, the gNB or eNB may indicate the information about the starting and/or ending position through DCI that triggers PRACH transmission.

In this case, the information about the starting position may be, for example, one of "boundary of symbol X" (e.g., X=0 or 1) or "within symbol X". Especially, if the information about the starting position indicates "within symbol X", the starting position may be configured as a timing after Y μsec and/or Timing Advance (TA)+Y μsec (e.g., Y=25 μsec or 16 μsec) from a starting position of symbol X.

Similarly, the information about the ending position may be one of "boundary of symbol Z" (e.g., Z=13 or 12) or "within symbol Z". Particularly, if the information about the ending position indicates "within symbol Z", the ending position may be configured as a timing prior to W μsec and/or TA+W μsec (e.g., W=25 μsec or 16 μsec) from an ending position of symbol (Z+1).

In contention-based PRACH transmission, such signaling may be configured by higher-layer signaling (e.g., RRC signaling, an MIB, or an SIB).

Thus, if the gNB or eNB indicates the starting position to the UE, the UE may perform alignment between PRACH transmission and/or PUSCH transmission starting timings of other UEs in the same SF using such signaling. In addition, if the gNB or eNB indicates the ending position to the UE, the UE may form a gap for performing LBT for PRACH transmission and/or PUSCH transmission of other UEs to be transmitted after the PRACH is transmitted, using such signaling.

4.2.2. CWS Adjustment

4.2.2.1. First CWS Adjustment Method

If the UE performs LBT corresponding to LBT type 1 for PRACH transmission, the UE may perform LBT using a CWS value corresponding to channel access priority class 1 for PUSCH transmission similar to the case of SRS transmission.

4.2.2.2. Second CWS Adjustment Method

There is no a response of the eNB or gNB to SRS transmission of the UE. Meanwhile, the UE may regard a random access response (RAR) in the case of PRACH transmission as a response of the eNB or gNB to PRACH transmission and adjust a CWS of LBT for PRACH transmission using the RAR.

In other words, the UE may be configured to adjust the CWS for PRACH transmission based on RAR reception separately from CWS adjustment for PUSCH transmission.

An allowed set of the CWS for PRACH transmission may be configured to be equal to that of channel access priority class 1 for UL transmission or the allowed set of the CWS may be configured separately from that of channel access priority class 1 for UL transmission. For example, when UE receives an RAR corresponding to a PRACH after transmitting the PRACH, the UE may initialize a CWS value. On the other hand, if the UE attempts to perform PRACH retransmission without receiving the RAR, the UE may increase the CWS value.

In this case, the above method may be applied only when PRACH transmission is triggered by an indication through a PDCCH. Alternatively, contention-based PRACH transmission may also be triggered by the indication through the PDCCH and the above method may be applied only to contention-free PRACH transmission. In this case, for contention-based PRACH transmission, the above-described first CWS adjustment method may be applied. This is because, in contention-based PRACH transmission, an RAR received by a specific UE may be an RAR corresponding to a PRACH transmitted by another UE, rather than an RAR corresponding to a PRACH transmitted by the specific UE, due to collision between PRACHs transmitted by multiple UEs.

Additionally, in the above-described second CWS adjustment method, the UE may deploy only a common CWS without separately deploying a CWS for a PUSCH and a CWS for a PRACH. That is, the UE may initialize CWS values corresponding to all priority classes upon receiving an RAR corresponding to a PRACH after PRACH transmission and increase the CWS values corresponding to all priority classes upon attempting to perform PRACH retransmission without receiving the RAR corresponding to the PRACH.

4.2.2.3. Third CWS Adjustment Method

During first PRACH transmission, the UE may perform LBT based on an always fixed CWS value (e.g., 3) separately from CWS adjustment for PUSCH transmission. Next, upon attempting to perform PRACH retransmission, the UE may attempt to PRACH retransmission by deploying the above-described various CWS adjustment methods.

4.2.2.4. Fourth CWS Adjustment Method

In an LTE release-14 enhanced Licensed Assisted Access (eLAA) system, if the eNB attempts to perform DL transmission including a UL grant without a PDSCH on an LAA SCell, a CWS value may be increased if the eNB successfully receives less than 10% of UL transport blocks corresponding to DL transmission This method may be limitedly applied to the case in which the UE attempts to perform UL transmission using LBT type 2 within channel occupancy secured by the eNB.

If an indication through a PDCCH triggers a PRACH, whether PRACH transmission corresponding thereto is performed may also be associated with CWS value adjustment. Specifically, in the LTE release-14 eLAA system to which the present invention is applicable, if the eNB attempts to perform DL transmission including a UL grant and DCI that triggers PRACH transmission without a PDSCH on the LAA SCell, the CWS value may be increased if the eNB successfully receives less than 10% of UL transport blocks and PRACHs corresponding to DL transmission.

4.2.3. LBT Type Change 4.2.3.1. First LBT Type Change Method

In a wireless communication system (e.g., LTE release-14 eLAA system) to which the present invention is applicable, the eNB or gNB may signal positions of UL subframes to the UE through a common PDCCH. Such signaling may be performed through offset and duration fields. For example, an offset value is indicated as L and a duration value is indicated as K on the common PDCCH transmitted in SF # n, the UE may recognize that subframes corresponding to SF # n+L to SF # n+L+K−1 are UL subframes through signaling.

If the UE desires to transmit a PRACH in a subframe which is signaled as a UL subframe by the common PDCCH, the UE may attempt to perform PRACH transmission by performing a preconfigured LBT method. In this case, the LBT method may be either LBT type 2 or No LBT. In other words, if the UE desires to transmit the PRACH in a subframe which is signaled as a UL subframe by the common PDCCH, the LBT method performed by the UE for PRACH transmission may be preconfigured as one of LBT type 2 and/or No LBT or may be configured by first-layer signaling or higher-layer signaling.

In this case, even when an LBT type is signaled as LBT type 1 by the above-described various methods, the UE may attempt to perform PRACH transmission by performing LBT corresponding to preconfigured LBT type 2 and/or No LBT regardless of signaling.

Alternatively, as another example, the UE may be basically configured to perform LBT type 1 for PRACH transmission if there is no additional signaling and may be configured to conform to the above-described LBT method only if the UE desires to transmit the PRACH in a subframe signaled as a UL subframe by the common PDCCH.

4.2.3.2. Second LBT Type Change Method

In terms of one UE, PRACH transmission may be triggered on a plurality of unlicensed carriers.

To this end, a specific UE may perform LBT type 1 so that multiple unlicensed carriers on which the PRACH is to be transmitted at the same timing may be configured as one group. In this case, the UE may perform LBT type 1 only on one specific carrier among multiple carriers within a corresponding group and perform an LBT method corresponding to LBT type 2 or No LBT on the other carriers. Upon succeeding in performing LBT type 1, the UE may perform PRACH transmission on carriers on which LBT type 2 is successfully performed among the other carriers or on all the other carriers.

Herein, carriers on which the UE performs LBT type 1 may be randomly selected by the UE from among carriers within the group or may be configured by the eNB.

Alternatively, a primary cell (PCell) or (when dual connectivity is applied) a primary secondary cell (PSCell) among the carriers within the group may be preconfigured as a carrier on which LBT type 1 is performed.

4.2.3.3. Third LBT Type Change Method

Upon recognizing that a gap between a starting position of a PRACH configured for the UE and a timing at which previous DL transmission ends is less than T μsec, the UE may be configured to perform LBT corresponding to LBT type 2 or No LBT for PRACH transmission.

For example, when T μsec from a boundary of symbol 0 within symbol 0 of SF # n is indicated as a PRACH starting position to the UE, if the UE recognizes that a current DL subframe is a full subframe (or a normal subframe) through a common PDCCH on SF # n−1, the UE may perform LBT corresponding to LBT type 2 or No LBT for PRACH transmission.

In this case, an LBT method permitted for the UE may be differently configured according to a T value. If the gap (e.g., T value) is less than 16 μsec, a rule may be configured to permit the No LBT method for the UE and, if the gap exceeds 16 μsec but is equal to or less than 25 μsec, a rule may be configured to permit LBT type 2 for the UE.

Alternatively, when the UE that has recognized that a discovery reference signal (DRS) has been transmitted in SF # n−1 attempts to perform PRACH transmission at a subframe boundary of SF # n and/or within SF # n, the UE may attempt to perform PRACH transmission by performing LBT corresponding to LBT type 2 or No LBT for PRACH transmission.

Figure 17:
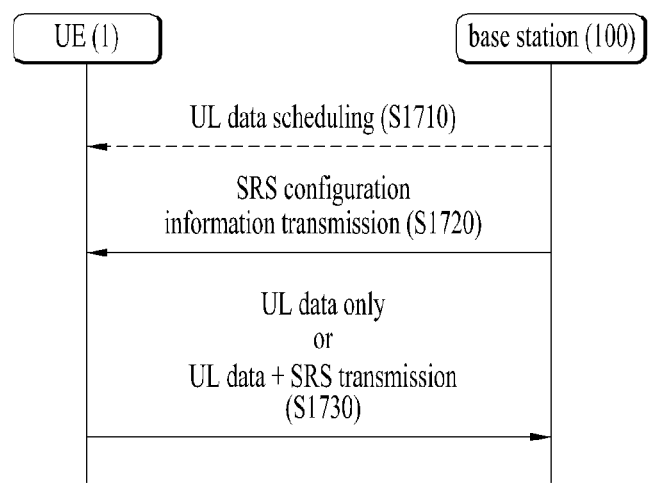
FIG. 17 is a diagram illustrating a signal transmission and reception method between a user equipment and a base station according to an embodiment of the present invention.

FIG. 17 is a diagram illustrating a signal transmission and reception method between a UE and an eNB according to an embodiment of the present invention.

As illustrated in FIG. 17, the UE may receive a signal for scheduling UL data transmission from the base station (S1710). In this case, UL data scheduling information may be transmitted via DCI or physical-layer signaling.

Next, the UE receives SRS configuration information from the base station (S1720).

In this case, the SRS configuration information may include information on an SRS resource configured for the SRS within a time interval where UL data is scheduled and a validity information related to the SRS resource.

Additionally, the SRS configuration information may further include at least one of information on a maximum bandwidth that can be spanned by the SRS resource, information on a periodicity and an offset value for the SRS configuration, information on the number of antenna ports for the SRS is configured, and sequence information regarding the SRS.

In this case, the sequence information regarding the SRS may include at least one of a cyclic shift value applied to the SRS, an orthogonal cover code applied to the SRS, and sequence scrambling information applied to the SRS.

While, in FIG. 17, the SRS configuration information is illustrated as being transmitted by one transmission and reception operation, part of the information included in the SRS configuration information may be transmitted by different signaling schemes. As an example, a part of the information included in the SRS configuration information may be transmitted via higher-layer signaling and the remaining part of the information included in the SRS configuration information may be transmitted via physical-layer signaling.

Next, the UE performs signal transmission including only UL data or including the UL data and an SRS (S1730).

More specifically, when the validity information related to the SRS resource received in S1720 indicates that the SRS resource is not valid, the UE may transmit only the UL data without performing rate matching for the SRS resource.

Alternatively, when the validity information related to the SRS resource received in S1720 indicates that the SRS resource is valid, the UE may transmit the UL data by performing rate matching for the SRS resource and simultaneously transmit the SRS via the SRS resource based ono an SRS transmission method indicated by the SRS configuration information.

In this case, the SRS transmission method indicated by the SRS configuration information may indicate one of a non-zero power transmission method and a zero power transmission method.

For example, if the SRS configuration information indicates the zero power transmission method, the UE may transmit rate-matched UL data using much power.

As another example, if the SRS configuration information indicates the non-zero power transmission method, the UE may transmit the rate-matched UL data and the SRS based on a preset ratio value.

Since each of the examples of the proposed methods can be considered as one method for implementing the present invention, it is apparent that each example can be regarded as a proposed method. In addition, it is possible to implement the proposed methods not only independently but by combining (or merging) some of the proposed methods. Moreover, a rule may be defined such that information on whether the proposed methods are applied (or information on rules related to the proposed methods) should be transmitted from a base station to a terminal through a predefined signal (e.g., physical layer signal, higher layer signal, etc.).

5. Device Configuration

Figure 18:
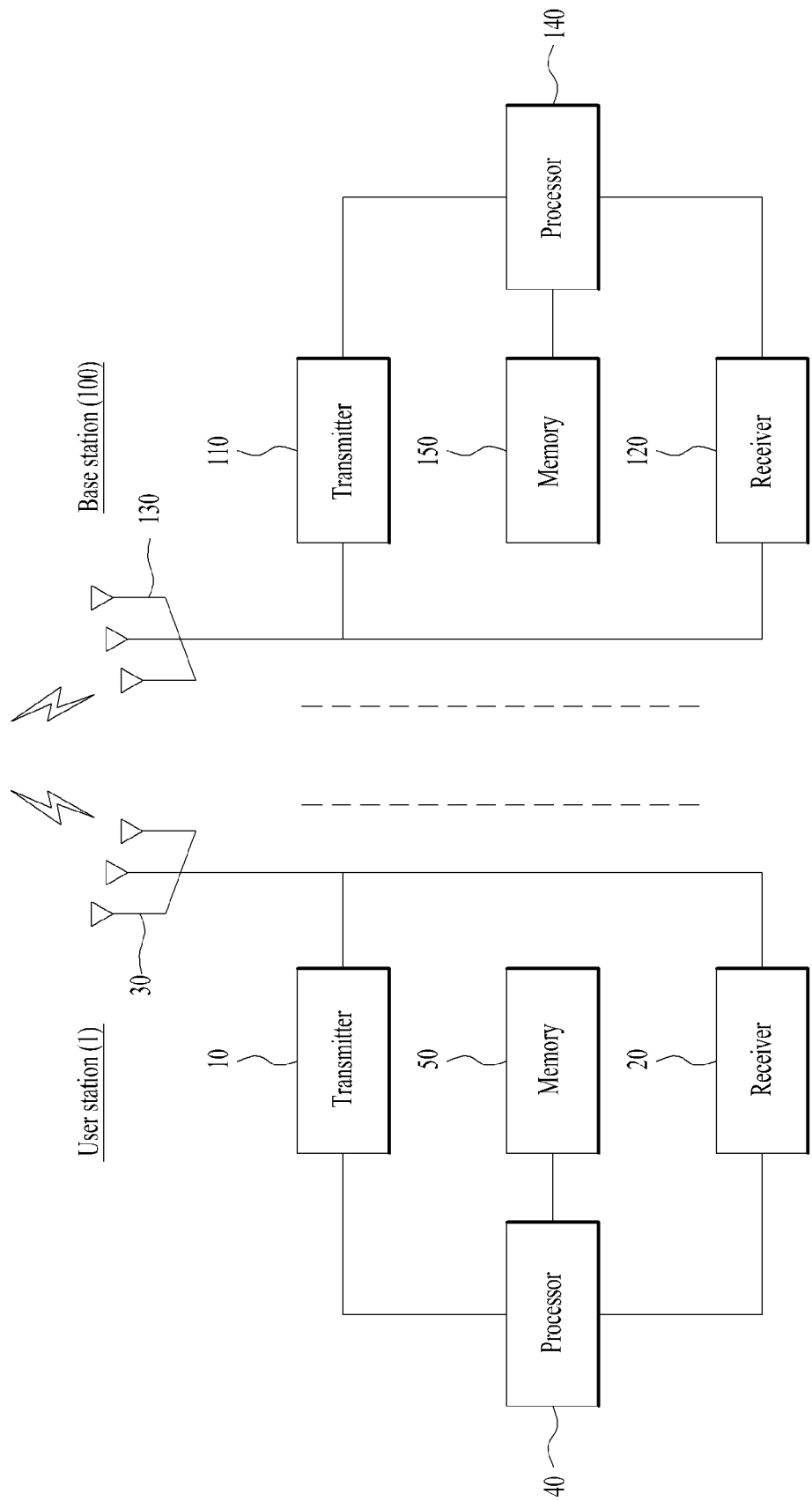
FIG. 18 is a diagram illustrating configurations of a user equipment and a base station capable of being implemented by embodiments proposed in the present invention.

FIG. 18 is a diagram illustrating configurations of a UE and a base station capable of being implemented by the embodiments proposed in the present invention. The UE and the base station shown in FIG. 18 operate to implement the embodiments of the method for transmitting and receiving signals.

A UE 1 may act as a transmission end on a UL and as a reception end on a DL. A base station (eNB or new generation NodeB (gNB)) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured in this way may receive the SRS configuration information through the receiver 20 and perform signal transmission including UL data based on the SRS configuration information through the transmitter 10.

The base station 100 may transmit SRS configuration information to the UE 1 through the transmitter 110 and receive UL data (or UL data and an SRS) transmitted based on the SRS configuration information through the receiver 120.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting a signal to a base station by a user equipment in a wireless communication system, the method comprising:
receiving sounding reference signal (SRS) configuration information from the base station, wherein the SRS configuration information includes information on an SRS resource configured for an SRS within a time interval where uplink data is scheduled, and validity information related to the SRS resource; and
transmitting a signal including the uplink data based on the SRS configuration information,
wherein the validity information is based on the SRS resource overlapping, at least in part, with a downlink channel state information reference signal resource,
wherein based on the SRS resource not being valid, the user equipment transmits the uplink data without performing rate matching for the SRS resource, and
wherein based on the SRS resource being valid, the user equipment transmits the uplink data with rate matching for the SRS resource and transmits the SRS via the SRS resource based on an SRS transmission method according to the SRS configuration information.

2. The method of claim 1, wherein the SRS configuration information further includes at least one of:
information on a maximum allowed bandwidth spanned by the SRS resource;
information on a periodicity and an offset value for the SRS configuration;
information on the number of antenna ports for the SRS configuration; and
sequence information related to the SRS.

3. The method of claim 2, wherein the sequence information related to the SRS includes at least one of:
a cyclic shift value applied to the SRS;
an orthogonal cover code applied to the SRS; and
sequence scrambling information applied to the SRS.

4. The method of claim 2, wherein a part of the information included in the SRS configuration information is received via higher-layer signaling and a remaining part of the information included in the SRS configuration information is received via physical-layer signaling.

5. The method of claim 1, wherein the SRS transmission method is one of a non-zero power transmission method and a zero power transmission method.

6. A method of receiving a signal from a user equipment by a base station in a wireless communication system, the method comprising:
transmitting sounding reference signal (SRS) configuration information to the user equipment, wherein the SRS configuration information includes information on an SRS resource configured for an SRS within a time interval where uplink data is scheduled, and validity information related to the SRS resource; and
receiving a signal including the uplink data based on the SRS configuration information,
wherein the validity information is based on the SRS resource overlapping, at least in part, with a downlink channel state information reference signal resource,
wherein based on the SRS resource not being valid, the base station receives the uplink data without rate matching for the SRS resource, and
wherein based on the SRS resource being valid, the base station receives the uplink data with rate matching for the SRS resource and receives the SRS via the SRS resource based on an SRS transmission method according to the SRS configuration information.

7. The method of claim 6, wherein the SRS configuration information further includes at least one of:
information on a maximum allowed bandwidth spanned by the SRS resource;
information on a periodicity and an offset value for the SRS configuration;
information on the number of antenna ports for the SRS configuration; and
sequence information related to the SRS.

8. The method of claim 7, wherein the sequence information related to the SRS includes at least one of:
a cyclic shift value applied to the SRS;
an orthogonal cover code applied to the SRS; and
sequence scrambling information applied to the SRS.

9. The method of claim 7, wherein a part of the information included in the SRS configuration information is transmitted via higher-layer signaling and a remaining part of the information included in the SRS configuration information is transmitted via physical-layer signaling.

10. The method of claim 6, wherein the SRS transmission method is one of a non-zero power transmission method and a zero power transmission method.

11. A user equipment for transmitting a signal to a base station in a wireless communication system, the user equipment comprising:
   a transmitter;
   a receiver; and
   a processor, operatively connected to the transmitter and the receiver,
   wherein the processor is configured to receive sounding reference signal (SRS) configuration information from the base station,
   wherein the SRS configuration information includes information on an SRS resource configured for an SRS within a time interval where uplink data is scheduled, and validity information related to the SRS resource,
   wherein the processor is further configured to transmit a signal including the uplink data based on the SRS configuration information,
   wherein the validity information is based on the SRS resource overlapping, at least in part, with a downlink channel state information reference signal resource,
   wherein based on the SRS resource not being valid, the processor is configured to transmit the uplink data without rate matching for the SRS resource, and
   wherein based on the SRS resource being valid, the processor is configured to transmit the uplink data with rate matching for the SRS resource and transmit the SRS via the SRS resource based on an SRS transmission method according to the SRS configuration information.

* * * * *